US009528431B2

(12) United States Patent
Palko

(10) Patent No.: US 9,528,431 B2
(45) Date of Patent: Dec. 27, 2016

(54) COMPRESSOR STAGE OF A TURBOCHARGER WITH FLOW AMPLIFIER

(71) Applicant: BorgWarner Inc., Auburn Hills, MI (US)

(72) Inventor: John Palko, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/442,762

(22) PCT Filed: Nov. 14, 2013

(86) PCT No.: PCT/US2013/069978
§ 371 (c)(1),
(2) Date: May 14, 2015

(87) PCT Pub. No.: WO2014/085095
PCT Pub. Date: Jun. 5, 2014

(65) Prior Publication Data
US 2015/0285134 A1  Oct. 8, 2015

Related U.S. Application Data

(60) Provisional application No. 61/730,623, filed on Nov. 28, 2012.

(51) Int. Cl.
F02B 37/22       (2006.01)
F02B 37/16       (2006.01)
(Continued)

(52) U.S. Cl.
CPC ............ *F02B 37/225* (2013.01); *F02B 33/446* (2013.01); *F02B 37/16* (2013.01); *F04D 29/422* (2013.01);
(Continued)

(58) Field of Classification Search
CPC ....... F02B 37/225; F02B 33/446; F02B 37/16; F04D 29/441; F04D 29/442
(Continued)

(56) References Cited

U.S. PATENT DOCUMENTS 5,762,034 A  *  6/1998  Foss ........................... F01P 5/06
                                                      123/41.49
6,244,817 B1 *  6/2001  Ngo .......................... B63H 1/16
                                                         415/119
(Continued)

Primary Examiner — Nicholas J Weiss
Assistant Examiner — Jason T Newton
(74) Attorney, Agent, or Firm — A. Michael Tucker; Stephan A. Pendorf; Patent Central LLC

(57) ABSTRACT

An energy recovery system and method is provided for the compressor stage of a turbocharger during surge avoidance operation. The compressor stage includes a housing defining an inlet, an inlet chamber, a diffuser and a volute. A flow amplifier is provided in the compressor housing or in a separate element. If the compressor stage is operating near a surge condition, charge air from a system charge air source is routed to the flow amplifier which discharges the air substantially along the inner peripheral surface of the inlet chamber in a downstream direction relative to the air intake flow direction. The charge air is supplied in a substantially annular manner at an increased velocity such that at least a portion of the intake air flow is entrained by the charge air so as to increase the velocity of the air toward the compressor wheel and recovering energy of the charge air.

15 Claims, 6 Drawing Sheets

(51) Int. Cl.
  *F02B 33/44*   (2006.01)
  *F04D 29/42*   (2006.01)
  *F04D 29/44*   (2006.01)
  *F02B 37/12*   (2006.01)

(52) U.S. Cl.
  CPC ............ *F04D 29/441* (2013.01); *F02B 37/22* (2013.01); *F02B 2037/125* (2013.01); *Y02T 10/144* (2013.01)

(58) Field of Classification Search
  USPC .......................... 60/611, 605.2; 239/DIG. 7
  See application file for complete search history.

(56) References Cited

U.S. PATENT DOCUMENTS

| | | | | |
|---|---|---|---|---|
| 6,634,174 B2* | 10/2003 | Sumser | ................ | F02B 37/225 60/602 |
| 6,896,475 B2* | 5/2005 | Graziosi | ............... | F01D 25/305 415/1 |
| 7,097,414 B2* | 8/2006 | Stangeland | ........... | F04D 29/426 415/183 |
| 7,721,542 B2* | 5/2010 | Chen | ................ | F02M 35/10157 123/568.17 |
| 7,967,556 B2* | 6/2011 | Gummer | ............. | F04D 27/0215 415/144 |
| 8,056,340 B2* | 11/2011 | Vaught | ................... | F02B 33/44 123/568.17 |
| 8,162,591 B2* | 4/2012 | Grauer | ................... | F01D 5/145 415/108 |
| 8,262,351 B2* | 9/2012 | Clemen | ................ | F04D 27/0207 415/115 |
| 9,091,275 B2* | 7/2015 | Chen | ...................... | F04D 25/04 |
| 9,243,550 B2* | 1/2016 | Miazgowicz | ........... | F02B 37/16 |
| 2008/0060355 A1* | 3/2008 | Evulet | ................... | F02B 37/02 60/605.1 |
| 2008/0232952 A1* | 9/2008 | Gu | ...................... | F04D 27/0215 415/11 |
| 2008/0247866 A1* | 10/2008 | Sirakov | ............... | F04D 29/4213 415/144 |
| 2008/0247870 A1* | 10/2008 | Sirakov | ............... | F04D 29/4213 415/226 |
| 2011/0214421 A1* | 9/2011 | Schmitt | ................... | F02B 39/00 60/605.2 |
| 2011/0215204 A1* | 9/2011 | Evulet | ................... | B64D 33/02 244/53 B |

\* cited by examiner

COMPRESSOR STAGE OF A TURBOCHARGER WITH FLOW AMPLIFIER

FIELD OF THE INVENTION

Embodiments related in general to turbochargers and, more particularly, to the compressor stage of a turbocharger.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and can reduce the aerodynamic frontal area of a vehicle.

Referring to FIG. 1, a turbocharger (10) uses the exhaust flow from the engine exhaust manifold to drive a turbine wheel (12), which is located in a turbine housing (14) to form a turbine stage (16). The energy extracted by turbine wheel (12) is translated into a rotating motion which then drives a compressor wheel (18), which is located in a compressor housing (20), to form a compressor stage (22). The compressor wheel (18) draws air into the turbocharger (10), compresses this air, and delivers it to the intake side of an engine (not shown).

Turbocharger compressors include three main components: the compressor wheel (18), a diffuser (24), and the housing (20). The compressor stage (22) works by drawing air axially into an inlet (25) of the compressor housing (20) and accelerating the air to high tangential and radial velocity through the rotational speed of the compressor wheel (18). This air, which still has substantial kinetic energy, is expelled in a radial direction into the diffuser (24). The diffuser (24) recovers as much of the kinetic energy as possible, by translating the high velocity of the air into increased air pressure and temperature. The volute (26) then collects the air and slows it down before it reaches the compressor exit, further recovering velocity into pressure.

The operating behavior of a compressor within a turbocharger may be graphically illustrated by a "compressor map" associated with the turbocharger. FIG. 2 depicts an example of a map for a compressor stage. The Y axis (28) is the pressure ratio, that is, the ratio of air pressure out of the compressor to the air pressure into the compressor. The X axis (30) is the mass flow rate (here in Kg/sec) into the compressor stage. In general, the operating behavior of a compressor wheel is limited on the left side of the compressor map by a surge line (32) and on the right side of the compressor map by a choke line (34). The generally horizontal lines (36) are lines of equal turbocharger speed. The compressor map can include an engine operating line (38), which shows, for a given set of operating conditions, where the map fits the air requirements of the engine operating regime.

The surge line (32) is a test-generated line. At each speed line, the surge point is detected, noted, and then interpolated for the entire map. The surge condition can move with installation conditions so it must be tested for each set of installation parameters.

The surge line basically represents "stalling" of the airflow at the compressor inlet. As air passes through the air channels between the blades of the compressor wheel, boundary layers build up on the blade surfaces. These low momentum masses of air are considered a blockage and loss generators. When too small a volume flow and too high of an adverse pressure gradient occurs, the boundary layer can no longer adhere to the suction side of the blade. When the boundary layer separates from the blade, stall and reversed flow occurs. Stall will continue until a stable pressure ratio, by positive volumetric flow rate, is established. However, when the pressure builds up again, the cycle will repeat. This flow instability continues at a substantially fixed frequency, and the resulting behavior is known as surging. The phenomenon of surge is quite violent, causing rapid changes of speed and load reversals in the turbocharger, the result of which is often destruction of the turbocharger. The turbocharger must be kept out of this operating range.

One known method that is employed to avoid surge involves bypassing air from the high pressure side of the compressor (i.e., the volute or compressor exit) and resupplying it to the compressor inlet. As a result, the mass flow of air into the compressor is increased and the operational point of the compressor stage moves away from the surge line. In the compressor map example of FIG. 2, the operational point would move to the right on the map. While such a bypass system can be helpful in avoiding surge, the energy of such bypass air is wasted.

Thus, there is a need for systems and methods to recover energy from charge air used during surge avoidance operation of the compressor stage.

SUMMARY OF THE INVENTION

In one respect, embodiments are directed to a compressor stage for a turbocharger. The compressor stage includes a compressor housing defining at least in part an inlet, an inlet chamber, a diffuser and a volute. The flow amplifier has an inlet and an outlet. The outlet is configured to discharge fluid, such as air, substantially along an inner peripheral surface of the compressor housing. The outlet of the flow amplifier is oriented in a downstream direction relative to the direction of fluid flow in the inlet chamber. The flow amplifier is configured to increase the velocity of air that is discharged from the outlet.

In one embodiment, the flow amplifier can be defined by the compressor housing. In such case, a chamber can be formed within the compressor housing. The chamber can be in fluid communication with the inlet chamber by the outlet of the flow amplifier. In another embodiment, the flow amplifier can be defined by an element that is separate from the compressor housing. The element can be attached to the compressor housing.

In another respect, embodiments are directed to a system for recovering energy during surge avoidance operation of the compressor stage of a turbocharger. The system includes a compressor stage. The compressor stage includes a compressor housing defining at least in part an inlet, an inlet chamber, a diffuser and a volute. The compressor stage also includes a flow amplifier. The flow amplifier has an inlet and an outlet. The outlet is configured to discharge fluid, such as air, substantially along an inner peripheral surface of the compressor housing. The outlet is oriented in a downstream direction relative to the direction of fluid flow in the inlet chamber. The outlet is located downstream of the inlet of the compressor housing. The flow amplifier is configured to increase the velocity of air that is discharged from the outlet.

In one embodiment, the flow amplifier can be defined by the compressor housing. In such case, a flow amplifier chamber can be formed within the compressor housing. The flow amplifier chamber can be in fluid communication with the inlet chamber by the outlet of the flow amplifier. In another embodiment, the flow amplifier can be defined by an element that is separate from the compressor housing. The element can be attached to the compressor housing.

A system charge air source is fluidly connected to the fluid amplifier by a bypass conduit. A valve is disposed along the bypass conduit. The valve includes a closed mode in which fluid communication is substantially restricted between the system charge air source and the flow amplifier. The valve further includes an open mode in which fluid communication is permitted between the system charge air source and the flow amplifier. The system is configured such that the valve is in an open mode when the compressor stage is operating near a surge condition.

In yet another respect, embodiments are directed to a method of recovering energy from an air flow during surge avoidance operation of a compressor stage of a turbocharger. The compressor stage includes a compressor housing that defines at least in part an inlet, an inlet chamber, a diffuser and a volute. The inlet chamber has an inner peripheral surface. The compressor stage inducts air into an inlet of the compressor stage such that there is an inlet air flow within the inlet chamber. If the compressor stage is operating near a surge condition, then charge air is routed from a system charge air source to the compressor stage. The charge air is supplied at an increased velocity substantially along the inner peripheral surface of the inlet chamber and in a downstream direction relative to the direction of air flow in the inlet chamber. The charge air is supplied in a substantially annular manner such that at least a portion of the inlet air flow is entrained by the charge air such that the velocity of the air toward the compressor wheel is increased. As a result, a portion of energy of the charge air is recovered. Further, the mass flow of air into the compressor stage increases so as to move the operation of the compressor stage moves away from a near surge condition. When the operation of the compressor stage is no longer near a surge condition, the routing and supplying the charge air can be discontinued.

BRIEF DESCRIPTION OF THE DRAWINGS

Embodiments are illustrated by way of example and not limitation in the accompanying drawings in which like reference numbers indicate similar parts and in which.

DETAILED DESCRIPTION OF THE INVENTION

Arrangements described herein relate to a flow amplifier system for use during surge avoidance operation of the compressor stage of a turbocharger. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 3-6, but the embodiments are not limited to the illustrated structure or application.

Figure 1:
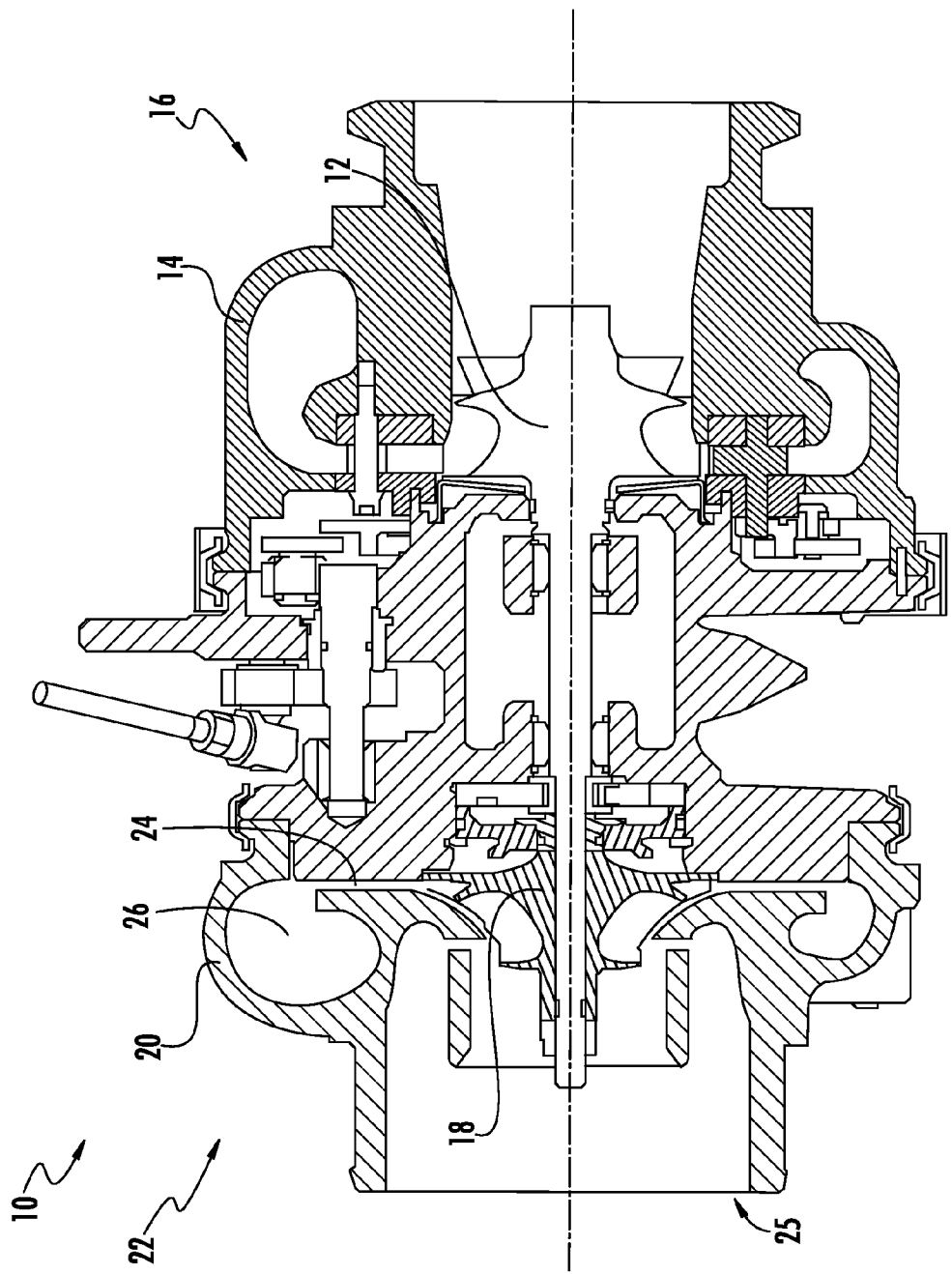
FIG. 1 is a cross-sectional view of a typical turbocharger.
Figure 2:
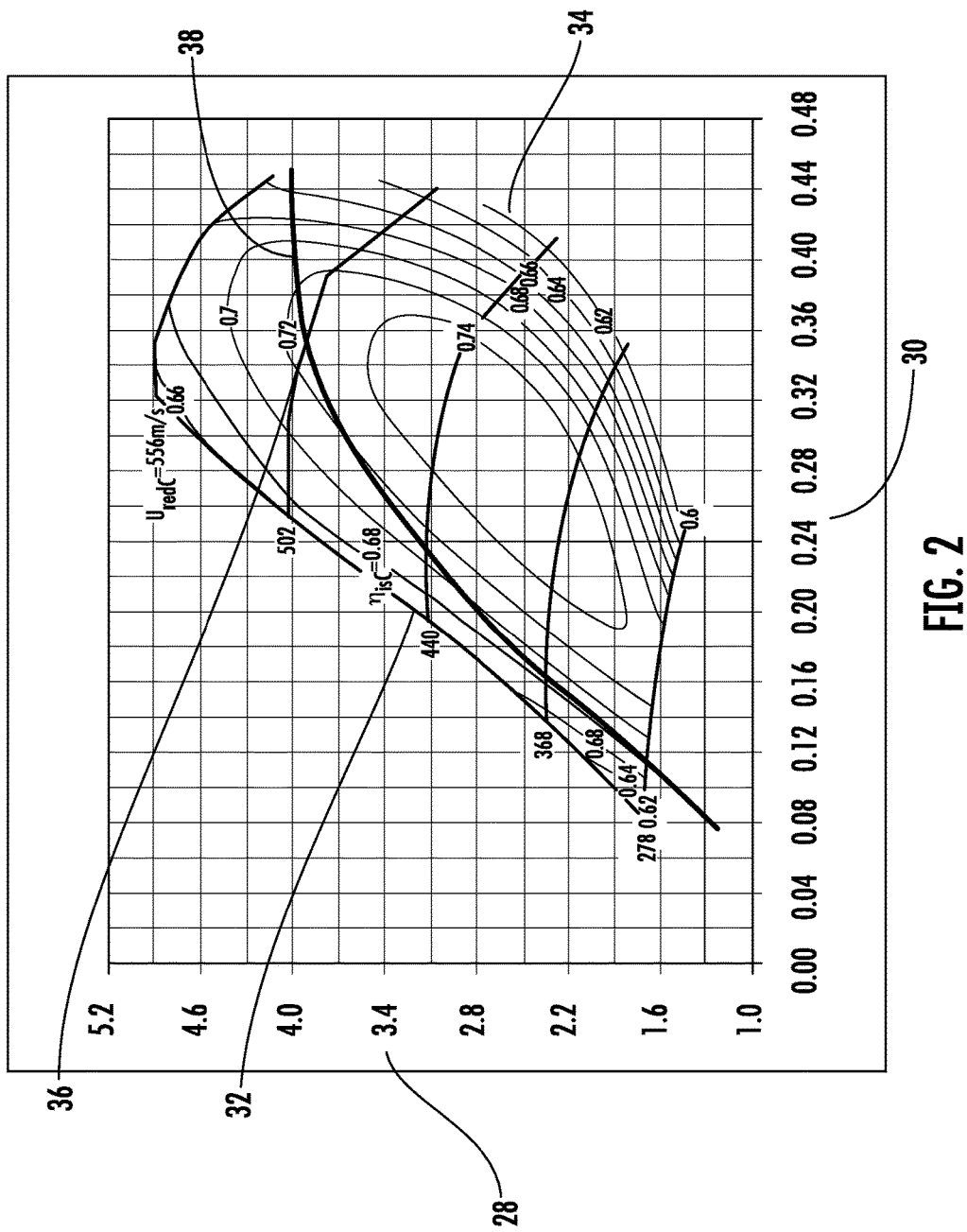
FIG. 2 is an example of a compressor map showing a surge line.
Figure 3:
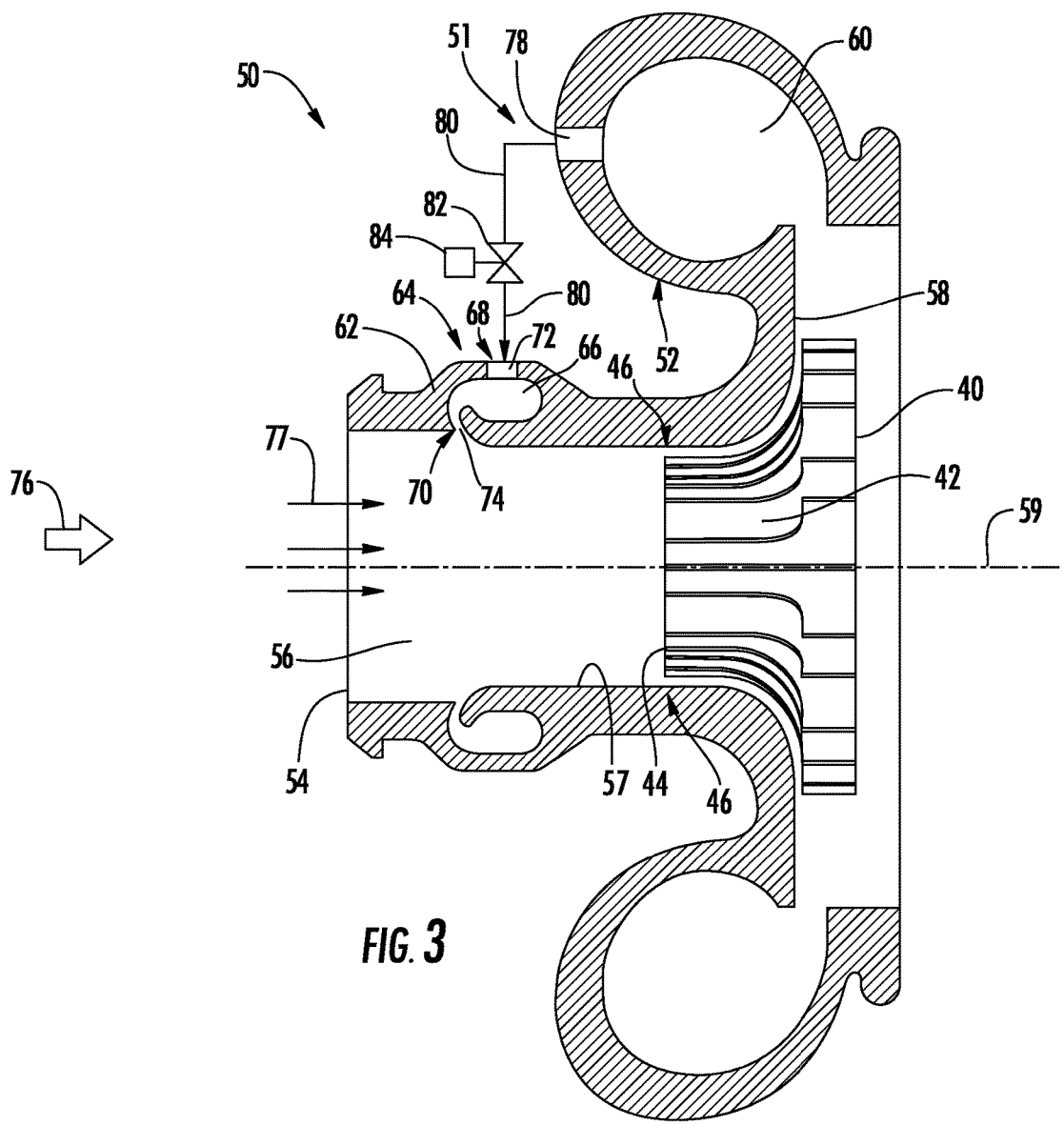
FIG. 3 shows a compressor stage configured according to embodiments herein.

Referring to FIG. 3, a portion of a compressor stage (50) for a turbocharger is shown. The compressor stage (50) includes a compressor housing (52) defining at least in part an inlet (54), an inlet chamber (56), a diffuser (58) and a volute (60). The inlet chamber (56) can be defined by an inner peripheral surface (57) of the compressor housing (52). The compressor stage (50) can have an associated longitudinal axis (59). The compressor housing (52) can be made of any suitable material.

The compressor stage (50) can include a compressor wheel (40). The compressor wheel (40) can have any suitable configuration. The compressor wheel (40) can include a plurality of blades (42). Each blade (42) can have an associated leading edge (44). The inner peripheral surface (57) of the compressor housing (52) can have a region (46) that is substantially aligned with the leading edges (44) of the compressor blades (42) when the compressor wheel (40) is installed in its operational position.

Figure 5:
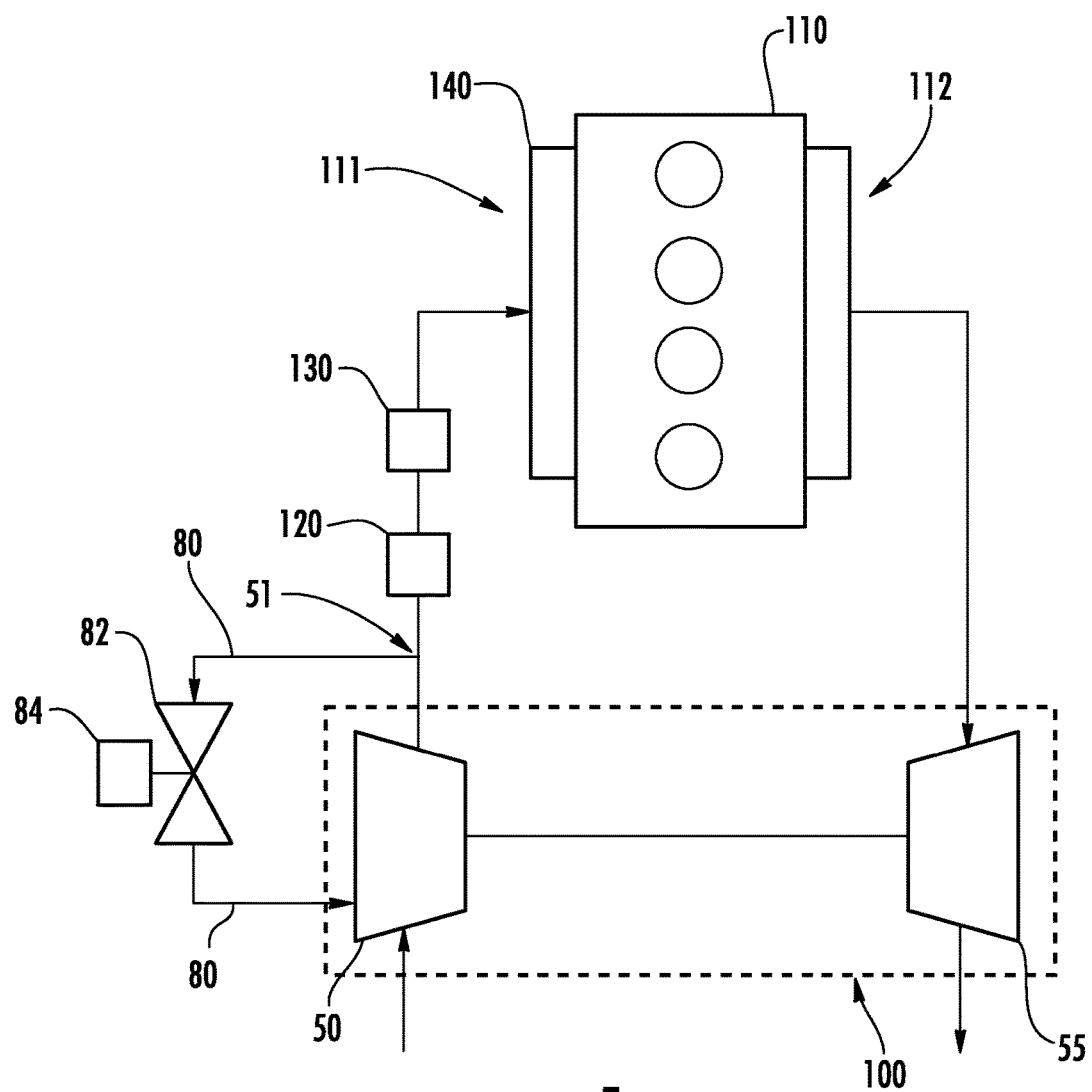
FIG. 5 is a schematic view of a turbocharger system according to embodiments herein.

The compressor stage (50) can be in fluid communication with the intake side (111) of an internal combustion engine (110) of a vehicle, as is shown in FIG. 5. The exhaust side (112) of the engine (110) can also be in fluid communication with a turbine stage (55) of the turbocharger (100). In some instances, there can be one or more components and/or systems disposed between the compressor stage (50) and the engine (110). For instance, there can be a charge air cooler (120), a throttle body valve (130) and/or an intake manifold (140). Again, it will be understood that some arrangements may or may not include such components and/or systems, and some arrangements may include other components and/or systems alternatively or additionally to those noted herein. Moreover, the components and/or systems disposed between the compressor stage (50) and the engine (110), if any, can be arranged in any suitable order.

Figure 4:
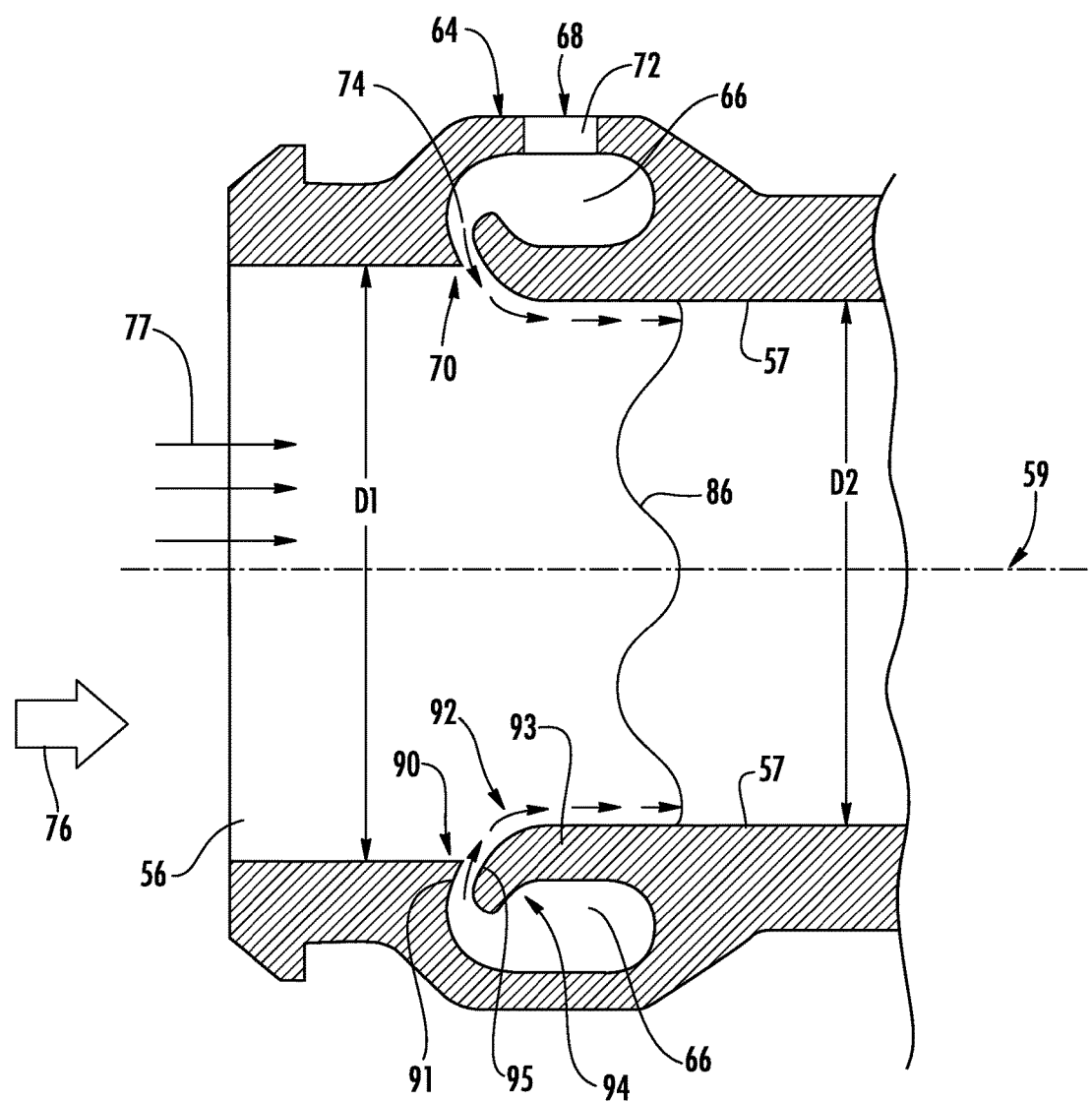
FIG. 4 is a close up view of a portion of a compressor housing having a flow amplifier according to embodiments herein.

A compressor stage (50) according to embodiments herein can include a flow amplifier (64). The flow amplifier (64) can be formed in any suitable manner. For instance, in one embodiment, the flow amplifier (64) can be formed in the compressor housing (52). As an example, a portion of a wall (62) of the compressor housing (52) that defines at least a portion of the inlet chamber (56) can be configured to include the flow amplifier (64), as is shown in FIGS. 3-4. As used herein, "configured to" means made to, designed to, capable of and/or suitable for.

The flow amplifier (64) can include a generally annular chamber (66). The chamber (66) can be a single continuous generally annular chamber. Alternatively, the chamber (66) can comprise a plurality of chambers, which may or may not be in fluid communication with each other. The chamber (66) can have any suitable cross-sectional shape. As an example, the chamber (66) can have a generally circular, oval, oblong, triangular, rectangular, polygonal cross-sectional shape, just to name a few possibilities. The chamber (66) can have an inlet (68) and an outlet (70).

The inlet (68) can be provided to allow fluid communication between the chamber (66) and the outside of the compressor housing (52) such that charge air can be supplied to the chamber (66). The inlet (68) can be defined by one or more apertures (72) formed in an outer wall of the compressor housing (62) in any suitable manner, such as by casting and/or machining. The apertures (72) can have any suitable size, shape and/or arrangement.

The outlet (70) can have any suitable configuration. In one embodiment, the outlet (70) can be defined by a generally annular aperture (74) defined in the wall (62) of the compressor housing (52). The aperture (74) can be configured to provide the desired exit from the chamber (66). The outlet (70) can be oriented such that air flow exits the chamber (66) generally in the downstream direction relative to the direction (76) of air flow (77) in the inlet chamber (56). That is, the outlet (70) can be oriented away from the inlet (54) and generally toward the compressor wheel (40). The outlet (70) can be oriented such that air exits therefrom substantially along the inner peripheral surface (57) of the inlet chamber (56) of the compressor housing (52). The flow amplifier (64) can be configured to discharge air from the outlet (70) at an increased velocity (e.g. greater than the velocity of the air received within the chamber (66)).

The chamber (66) and the aperture (74) can be formed in any suitable manner, such as by casting and/or machining. The aperture (74) can open into the compressor inlet chamber (56), thereby permitting fluid communication between the chamber (66) and the compressor inlet chamber (56). The outlet (70) can be defined by a single aperture (74) or by a plurality of apertures. The outlet (70) can be located at any suitable point along the axial length of the inlet chamber (56) of the compressor housing (52). For instance, the outlet (70) can be located upstream of the region (46) of the inner peripheral surface (57) that is substantially aligned with the leading edges (44) of the blades (42) of the compressor wheel (40). The outlet (70) can be located between the inlet (54) and the region (46) of the inner peripheral surface (57) that is substantially aligned with the leading edges (44) of the blades (42) of the compressor wheel (40).

Referring to FIG. 4, one embodiment of the aperture (74) is shown. The aperture (74) can be defined between an upstream portion (90) of the compressor housing (52) and a downstream portion (92) of the compressor housing (52). The terms "upstream" and "downstream" are used herein relative to the general direction (76) of air flow (77) in the inlet chamber (56) of the compressor stage (50). The upstream portion (90) can have any suitable configuration. In one embodiment, the upstream portion (90) can include a ramp surface (91) that can be generally oriented in the downstream direction. The ramp surface (91) can be substantially smooth. The ramp surface (91) can be curved or angled.

The downstream portion (92) can have any suitable configuration. In one embodiment, the downstream portion (92) can include a ramp surface (95). The ramp surface (95) can be generally complementary to the ramp surface (91) of the upstream portion (90). The ramp surface (95) can be generally oriented in the downstream direction. The ramp surface (95) can be substantially smooth. The ramp surface (95) can be curved or angled. The ramp surface (95) can smoothly transition to the inner peripheral surface (57) of the compressor housing (52). The ramp surfaces (91, 95) can be configured to collectively define an exit path from the chamber (66) so as to minimize or eliminate discontinuities from the exit flow.

In one embodiment, the ramp surface (95) can be provided on an end portion (94) of an axially extending wall (93). The end portion (94) can extend generally outwardly relative to the longitudinal axis (59). The end portion (94) can extend into the chamber (66) so as to form an overlapping end with the upstream portion (90).

It should be noted that the inner diameter of the inlet chamber (56) from the inlet (54) to the upstream portion (90) of the outlet (70) can be at a first diameter (D1). Downstream of the outlet (70), the inner peripheral surface (57) can be at a second diameter (D2). In one embodiment, the second diameter (D2) can be smaller than the first diameter (D1), as is shown in FIGS. 3-4. However, the first and second diameters (D1, D2) can be substantially equal. In some instances, the second diameter (D2) may be greater than the first diameter (D1).

According to embodiments herein, charge air can be supplied to the flow amplifier (64) from a system charge air source (51) (see FIGS. 3 and 5). "Charge air" means air that is at a pressure above the pressure of the air inducted at the compressor inlet (54). "System charge air source" means one or more suitable sources of charge air from the compressor stage (50) itself or from another source that is supplied with charge air from the compressor stage (50). For instance, the charge air source (51) can be one or more points along the fluid path between the axial upstream end of the compressor wheel and the engine (110). System charge air source (51) can include the diffuser (58), the volute (60) and/or the compressor outlet (not shown). Alternatively or in addition, the system charge air source (51) can also include one or more points outside of the compressor housing (52), such as along the flow path between the compressor outlet (not shown) and the engine (90), that are supplied with charge air from the compressor section (50). Examples of such sources include for example, a charge air cooler (120), throttle body valve (130) and engine intake manifold (140).

The system charge air source (51) can include an outlet (78) to allow passage of at least a portion of air from the system charge air source (51). As an example, the outlet (78) can be provided in the volute (60) to allow compressed air to be ducted therefrom. While FIGS. 3-4 show the outlet (78) as being provided in the volute (60), it will be understood that embodiments are not limited to this arrangement.

The flow amplifier (64) and the system charge air source (51) can be operatively connected in fluid communication in any suitable manner. The term "operatively connected," as used herein, can include direct or indirect connections, including connections without direct physical contact. For instance, a bypass conduit (80) can connect the system charge air source (51) (e.g., the compressor volute (60)) to the flow amplifier (64), more particularly, to the inlet (68) thereof. The bypass conduit (80) can be defined by any suitable structure, including, for example, one or more pipes, ducts, fittings, fasteners, hoses, and/or other components and/or systems. The bypass conduit (80) may be flexible or non-flexible along at least a portion of its length.

Fluid flow between the system charge air source (51) and the flow amplifier (64) can be controlled in any suitable manner, such as by a valve (82). The valve (82) can be operatively connected at any suitable location along the bypass conduit (80) between the system charge air source (51) and the flow amplifier (64). The valve (82) can be any suitable type of valve that can selectively permit and prevent flow along the bypass conduit (80).

The valve (82) can be controlled in any suitable manner. For instance, a controller (84) can be operatively connected to control the operation of the valve (82) in any suitable manner. The controller (84) can be an engine controller, a turbocharger controller, a valve controller or other suitable controller. The controller (84) can be adapted to selectively implement different operational modes of the valve (82). The term "selectively implement" and variants thereof means that the controller (84) can determine the appropriate operational mode to apply based on turbocharger operational data received by the controller from any suitable source or in response to commands from a user. The controller (84) can be comprised of hardware, software or any combination thereof. In some instances, the controller (84) can be integrated into the valve (82).

Under normal operational conditions of the compressor stage (50), the valve (82) can be in a closed mode, such that fluid communication between the system charge air source (51) and the flow amplifier (64) is prevented. However, when the turbocharger reaches one or more predetermined operational conditions (e.g., at a near surge condition), the valve (82) can be in an open mode in which fluid communication between the system charge air source (51) and the flow amplifier (64) is at least partially allowed.

Figure 6:
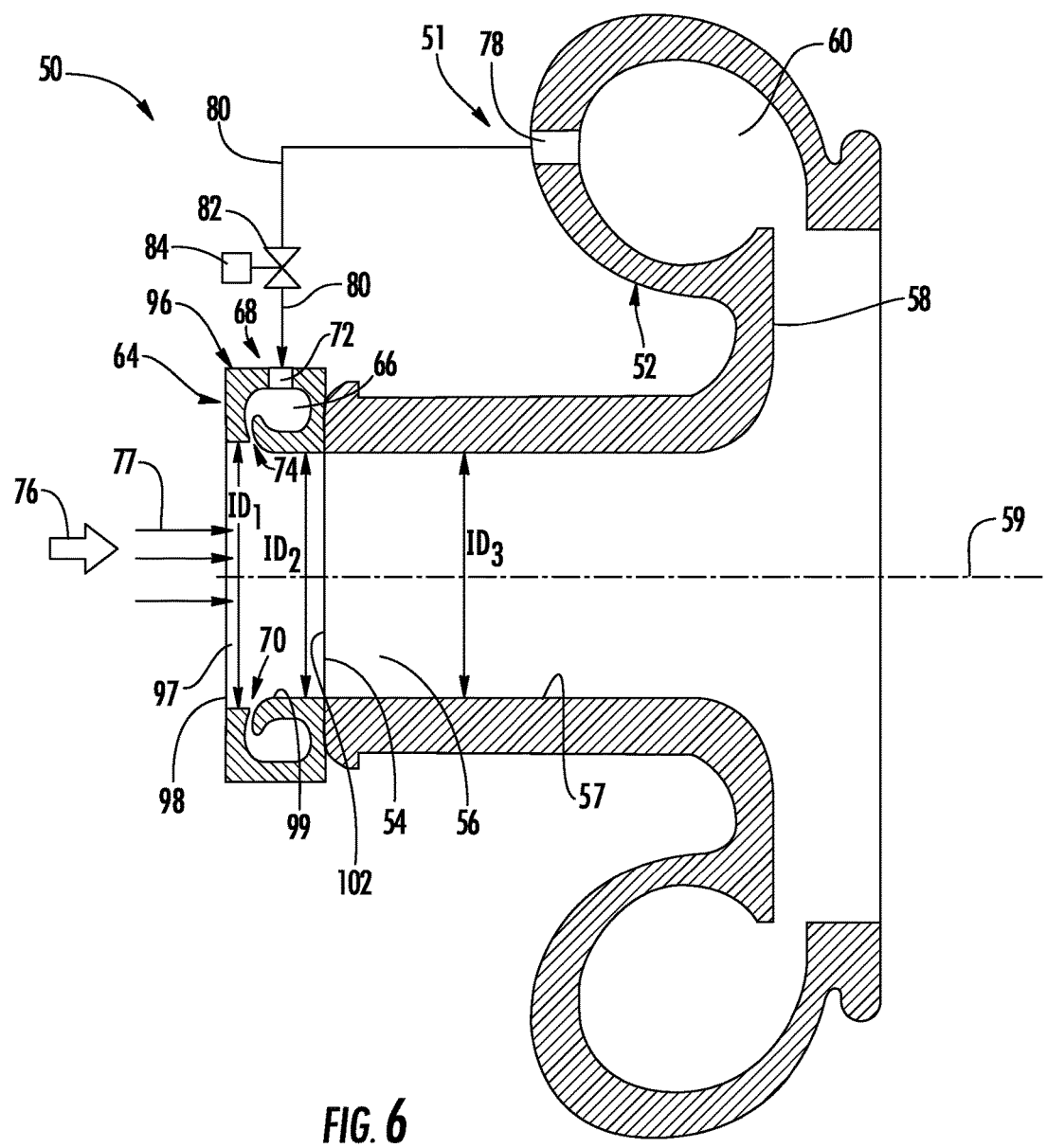
FIG. 6 shows another compressor stage configured according to embodiments herein.

In some instances, the flow amplifier (64) may be defined by a different structure than the compressor housing (52). FIG. 6 shows an example of a flow amplifier (64) defined by an element (96). The element (96) can be formed separately from the compressor housing (52). The element (96) can be formed in any suitable manner, such as by casting and/or machining. The element (96) can be made of any suitable material.

The element (96) can be attached to the compressor housing (52) in any suitable manner, such as by fasteners, mechanical engagement and/or welding, just to name a few possibilities. The element (96) can be attached to any suitable portion of the compressor housing (52), such as the inlet end thereof as is shown in FIG. 6. The element (96) can have any suitable size, shape and/or configuration.

The flow amplifier (64) can have a chamber (66), an inlet (68), an outlet (70), one or more inlet apertures (72), and one or more outlet apertures (74). The previous description of the flow amplifier (64) and its associated features shown and described in connection with FIGS. 3 and 4 is equally applicable to the flow amplifier (64) shown in FIG. 6. Likewise, the above description of the flow conduit (80), valve (82), and controller (86) shown in FIG. 3 is equally applicable to the flow amplifier (64) shown in FIG. 6.

It should be noted that the element (96) can have an inlet (98), an outlet (101) and an inner flow passage (97). The inner flow passage can have an inner peripheral surface (99). The inner peripheral surface (99) can be at a first diameter (ID1) from the inlet (98) of the element (96) to the outlet (70) of the flow amplifier (64). The inner peripheral surface (99) can be at a second diameter (ID2) from the outlet (70) of the flow amplifier (64) to the outlet (101) of the element (96).

In one embodiment, the second diameter (ID2) can be smaller than the first diameter (ID1), as is shown in FIG. 6. However, the first and second diameters (ID1, ID2) can be substantially equal. In some instances, the second diameter (ID2) may be greater than the first diameter (ID1).

When a separate element (96) is provided, the inner peripheral surface (57) of the inlet chamber (56) of the compressor housing (52) can have an associated inner diameter (ID3). The inner diameter (D3) can be substantially constant along at least a substantial portion of the axial length of the inlet chamber (56). In one embodiment, the second diameter (ID2) of the element (96) can be substantially equal to the diameter (ID3) of the inlet chamber (56) of the compressor housing (52), as is shown in FIG. 6. In another embodiment, the second diameter (ID2) of the element (96) can be smaller than the diameter (ID3) of the inlet chamber (56) of the compressor housing (52). In still another embodiment, the second diameter (ID2) of the element (96) can be greater than the diameter (ID3) of the inlet chamber (56) of the compressor housing (52).

The flow passage (97) can be in fluid communication with the inlet chamber (56). Thus, air inducted by the compressor stage (50) can initially be drawn through the flow passage (97) before entering the inlet chamber (56). The outlet (70) of the flow amplifier (64) can open into the flow passage (97), as shown in FIG. 6, thereby permitting fluid communication between the chamber (66) and the flow passage (97).

The outlet (70) can be configured to discharge air or other fluid therefrom substantially along the inner peripheral surface (57) of the inlet chamber (56) of the compressor housing (52). It will be understood that "substantially along the inner peripheral surface of the inlet chamber of the compressor housing" and variants thereof means that air or other fluid discharged from the outlet flows directly or indirectly into the inlet chamber of the compressor housing so as to be on or substantially near the inner peripheral surface of the compressor housing. FIGS. 3-4 show an example in which air discharged from the outlet (70) flows directly into the inlet chamber (56) of the compressor housing (52) substantially along the inner peripheral surface (57) thereof, as the flow amplifier (64) is formed with the compressor housing (52). FIG. 6 shows an example in which air discharged from the outlet (70) flows indirectly into the inlet chamber (56) of the compressor housing (52) because such air initially flows along the inner peripheral surface (99) of the element (96) before flowing into the inlet chamber (56) of the compressor housing (52) substantially along the inner peripheral surface (57) thereof.

Now that the various aspects of the compressor stage (50) with a flow amplifier (64) have been described, an example of the operation of such a system will now be described. However, it will be understood that the following description is merely exemplary. Various possible operational steps will now be described. However, it will be understood that the operation may include other steps that are not described here, and in fact, embodiments are not limited to including every step described. The steps that are described here are not limited to this particular chronological order, either. Indeed, some of the steps may be performed in a different order than what is shown and/or at least some of the steps shown can occur simultaneously.

The compressor stage (50) of the turbocharger (100) can be operated in the conventional manner. During turbocharger operation, the operational point at which the compressor stage (50) is operating can be determined in any suitable manner. For instance, the operational point can be determined based on information received from one or more sources, such as a compressor inlet pressure sensor, a compressor outlet pressure sensor, and/or a mass flow sensor. The determination of the operational point of the compressor stage (50) can be performed on a continuous, periodic, irregular or even random basis. The determined operational point can be compared to the compressor map for the turbocharger. The determination of the operational point can be performed by the controller (84) or by other suitable means.

When the operational point of the compressor stage (50) is operating under normal conditions (e.g., not in a near surge condition), the closed mode of the valve (82) can be selectively implemented by the controller (84) or by other suitable means. As a result, flow along the bypass conduit (80) can be restricted.

If the compressor stage (50) is operating near a surge condition, the valve (82) can be opened by the controller (84) or by other suitable means. In such case, charge air can be bled from the volute (60) or other system charge air source (51) through the outlet (78) and supplied to the chamber (66). Such air would exit the chamber (66) through the outlet (70) and enter the intake flow into the compressor stage (50).

"Near a surge condition" means that the operational point is sufficiently near the surge line within a predetermined threshold, such as, for example, when the operational point is located at or within about 10%, about 9%, about 8%, about 7%, about 6%, about 5%, about 4%, about 3%, about 2%, about 1%, about 0.5%, or less of the surge line in the X direction and/or in the Y direction of the compressor map.

Thus, it will be appreciated that the bleeding of air and pressure from the system charge air source (51) and the supplying of such air to the inlet air flow (77) can increase the total mass flow of air through the compressor stage (50). As a result, the operational point of the compressor stage (50) can move away from the surge line, thereby avoiding surge and allowing the compressor to operate in a more stable region of the compressor map.

Moreover, the flow amplifier (64) can allow at least a portion of the energy in the air from the system charge air source (51) to be recovered for beneficial use. The flow exiting the flow amplifier (64) can be accelerated as it exits through the outlet (70), which can be due to the geometry of the annular aperture (74). As noted above, the outlet (70) is configured to direct air exiting therefrom in the downstream flow direction. Further, the rounded surfaces of the outlet (70) can help to minimize or eliminate discontinuities in the flow such that the air expelled therefrom flows smoothly onto the inner peripheral surface (57).

The coanda effect is the tendency of a jet of fluid emerging from an orifice to follow an adjacent flat or curved surface and to entrain fluid from the surroundings so that a region of lower pressure develops. In this way, the flow exiting the chamber (66) can flow onto the inner peripheral surface (57) of the compressor housing (52). By way of the coanda effect, the air exiting the flow amplifier (64) can entrain the compressor inlet air flow (77) thus increasing the velocity of at least a portion of the inlet air flow (77).

Due to the inclusion of a flow amplifier (64) as described herein, the velocity profile of the intake air flow (77) to the compressor stage (50) can be different than it would otherwise be without the flow amplifier (64). As can be seen in FIG. 4, the velocity profile (86) of the flow can be higher in the center of the inlet flow (77) to the compressor stage (50). However, instead of a common parabolic velocity profile in which the velocity is greatest at the center of the flow and tapering to zero or near zero at the inner peripheral surface (57), the velocity profile (86) of the flow at the inner peripheral surface (57) is increased due to the jet of air expelled from the flow amplifier (64). The velocity of the flow at or near the inner peripheral surface (57) may be substantially the same as the velocity of the flow in the center of the flow. As a result, the overall velocity of air into the compressor stage (50) increases. A substantially similar velocity profile (86) can be achieved when the flow amplifier (64) is provided in a separate element, as is shown in FIG. 6.

Thus, it will be appreciated that the flow amplifier (64) can add kinetic energy to the flow (77). As a result, there can be an increase in pressure of the air at the compressor wheel (18). Accordingly, the compressor wheel (18) would not require as much work (i.e., it would not have to rotate as fast) to attain the desired pressure because it would not have to accelerate the air as much. In this way, a portion of the energy of the charge air that would normally be lost when simply resupplied to the compressor inlet (54) can be recovered.

When the compressor section (50) is no longer operating near a surge condition, the closed mode of the valve (82) can be selectively implemented by the controller (84) or by other suitable means, thereby preventing fluid communication between the flow amplifier (64) and the system charge air source (51).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

Aspects described herein can be embodied in other forms and combinations without departing from the spirit or essential attributes thereof. Thus, it will of course be understood that embodiments are not limited to the specific details described herein, which are given by way of example only, and that various modifications and alterations are possible within the scope of the following claims.

What is claimed is:

1. A compressor stage (50) for a turbocharger (100) comprising:
   a compressor housing (52) housing a compressor wheel (18) and defining at least in part an inlet (54) for receiving an inlet air flow (77), an inlet chamber (56) through which the inlet air flows from the inlet (54) towards the compressor wheel, a diffuser (58) and a volute (60);
   a flow amplifier (64) having an inlet (68) and an outlet (70), the outlet (70) separating the inlet chamber into an upstream portion upstream of the outlet (70) and a downstream portion downstream of the outlet (70),
   control means to permit introduction of compressed fluid to the inlet (68) of the flow amplifier (64) upon detection of a surge condition during operation of the turbocharger (100) and to block introduction of compressed fluid into the inlet (68) of the flow amplifier in the absence of detection of a surge condition,
   wherein the outlet (70) of the flow amplifier (64) is configured to discharge a jet of compressed fluid such that the discharged compressed fluid flows substantially along an inner peripheral surface (57) of the downstream portion of the inlet chamber in accordance with the Coanda effect and to entrain fluid flowing from the upstream portion of the inlet chamber into the downstream portion of the inlet chamber, increasing the velocity of at least a portion of the inlet air flow (77) in the downstream portion of the inlet chamber, the outlet (70) being oriented in a downstream direction of fluid flow in the inlet chamber (56).

2. The compressor stage (50) of claim 1, wherein the flow amplifier (64) is defined by the compressor housing (52) and includes a chamber (66) formed within the compressor housing (52), wherein the chamber (66) is in fluid communication with the inlet chamber (56) by the outlet (70).

3. The compressor stage (50) of claim 2, wherein the outlet (70) includes an aperture (74) defined by complementary ramp surfaces (91, 95) formed in the compressor housing (52).

4. The compressor stage (50) of claim 1, wherein the flow amplifier (64) is defined by a separate element (96) that is attached to the compressor housing (52).

5. The compressor stage (50) of claim 1, wherein the inlet (68) of the flow amplifier (64) being in fluid communication with at least one of the volute (60) or the diffuser (58), whereby charge air from the volute (60) and/or the diffuser (58) can be routed therefrom and supplied to the flow amplifier (64).

6. A system for recovering energy during surge avoidance operation of a compressor stage (50) of a turbocharger (100) comprising:
   a compressor housing (52) housing a compressor wheel (18) and defining at least in part an inlet (54) for receiving an inlet air flow (77), an inlet chamber (56) through which the inlet air flows from the inlet (54) towards the compressor wheel, a diffuser (58) and a volute (60);
   a flow amplifier (64) having an inlet (68) and an outlet (70), the outlet (70) separating the inlet chamber into an upstream portion upstream of the outlet (70) and a downstream portion downstream of the outlet (70), control means to permit introduction of compressed fluid to the inlet (68) of the flow amplifier (64) upon detection of a surge condition in during operation of the turbocharger (100) and to block introduction of compressed fluid into the inlet (68) of the flow amplifier in the absence of detection of a surge condition,
   wherein the outlet (70) of the flow amplifier (64) is configured to discharge a jet of compressed fluid such that the discharged compressed fluid flows substantially along an inner peripheral surface (57) of the downstream portion of the inlet chamber in accordance with the Coanda effect and to entrain fluid flowing from the upstream portion of the inlet chamber into the downstream portion of the inlet chamber, increasing the velocity of at least a portion of the inlet air flow (77) in the downstream portion of the inlet chamber, the outlet (70) being oriented in a downstream direction of fluid flow in the inlet chamber (56);
   a system charge air source (51) fluidly connected to the flow amplifier (64) by a bypass conduit (80); and
   a valve (82) under the control of the control means disposed along the bypass conduit (80), the valve (82) including a closed mode in which fluid communication is substantially restricted between the system charge air source (51) and the flow amplifier (64), the valve (82) including an open mode in which fluid communication is permitted between the system charge air source (51) and the flow amplifier (64), the control means being configured such that the valve (82) is in the open mode when the compressor stage (50) is operating near a surge condition.

7. The system of claim 6, wherein the flow amplifier (64) is defined by the compressor housing (52) and includes a chamber (66) formed within the compressor housing (52), wherein the chamber (66) is in fluid communication with the inlet chamber (56) by the outlet (70).

8. The system of claim 6, wherein the outlet (70) includes an aperture (74) defined by complementary ramp surfaces (91, 95) formed in the compressor housing (52).

9. The system of claim 6, wherein the flow amplifier (64) is defined by a separate element (96) that is attached to the compressor housing (52).

10. The system of claim 6, further including a controller (84) operatively connected to the valve (82) to selectively implement the open mode and the closed mode.

11. The system of claim 6, wherein the system charge air source (51) includes at least one of the volute (60) or the diffuser (58).

12. The system of claim 6, wherein the system charge air source (51) is located external to the compressor housing (52) but is supplied with charge air from the compressor stage (50).

13. The system of claim 12, wherein the system charge air source (51) is at least one of a charge air cooler (120), a throttle body valve (130) or an engine intake manifold (140).

14. A method of recovering energy from an air flow during surge avoidance operation of a compressor stage (50) of a turbocharger (100), the compressor stage (50) housing a compressor wheel (18) and including a compressor housing (52) defining at least in part an inlet (54), an inlet chamber (56), a diffuser (58) and a volute (60), the inlet chamber (56) having an inner peripheral surface (57), wherein the compressor stage (50) inducts air (77) into the inlet (54) such that there is an inlet air flow (77) within the inlet chamber (56), the method comprising:
   routing charge air from a system charge air source (51) to the compressor stage (50) when the compressor stage (50) is operating near a surge condition; and
   supplying the charge air at an increased velocity substantially along the inner peripheral surface (57) of the inlet chamber (56) and in a downstream direction in the inlet chamber (56), the charge air being supplied in a substantially annular manner such that at least a portion of the inlet air flow (77) is entrained thereby, whereby the velocity of inlet air flow (77) toward the compressor wheel (18) is increased such that a portion of energy of the charge air is recovered, and whereby the mass flow of air into the compressor stage increases so as to move the operation of the compressor stage away from a near surge condition.

15. The method of claim 14, wherein, when the operation of the compressor stage (50) is no longer near a surge condition, discontinuing the routing and supplying the charge air.

* * * * *